C. Goulding.
Sextant.
Nº 616.    Patented Feb. 24, 1838.
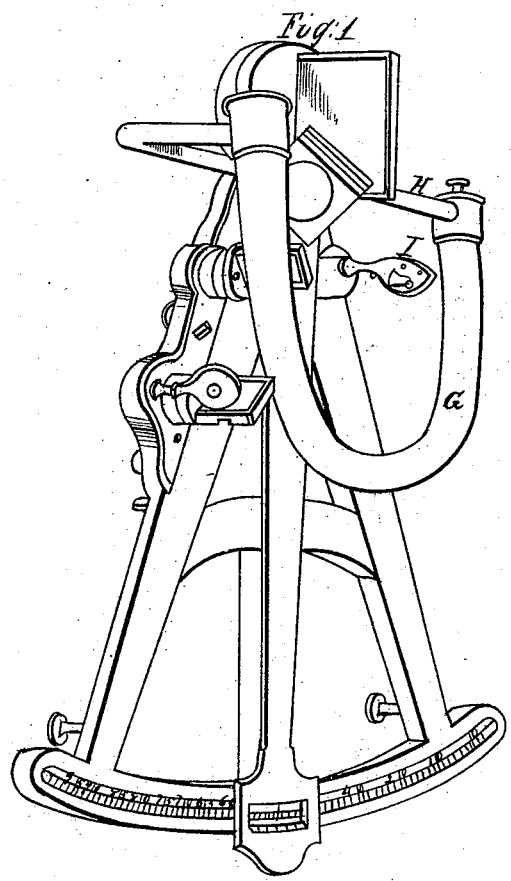

UNITED STATES PATENT OFFICE.

CHARLES GOULDING, OF MOBILE, ALABAMA.

ARTIFICIAL HORIZON FOR QUADRANTS AND SEXTANTS.

Specification of Letters Patent No. 616, dated February 24, 1838.

*To all whom it may concern:*

Be it known that I, CHARLES GOULDING, of the city and county of Mobile and State of Alabama, have invented a new and useful improvement, being an artificial horizon attached to the quadrant or sextant for taking the sun's altitude and giving the true latitude of a place without seeing the real horizon, either at sea or elsewhere, called "Goulding's artificial horizon for quadrants," which is described as follows, reference being had to the annexed drawings of the same, making part of this specification.

I make use of a semi-circular glass tube G Figure 1, whose ends are united by a straight metallic tube H which is fastened to the side of the quadrant by suitable arms or braces. This semi-circular tube will contain a column of colored liquid nearly as long as the glass tube, or of such lengths that its two ends will always be in the same plane with the sight, which will be in the center of the chord of the curve formed by the column of liquid. A communication is had from one end of the glass tube to the other through the metallic tube so that the air above the liquid may pass from one side to the other, as the liquid rises or falls in the tube.
To apply this improvement for taking the sun's altitude with the quadrants, having adjusted the several glasses, turn your face toward the sun holding the instrument with your right hand, in a vertical position, put your eye close to the sight or vane I and view the artificial horizon, (which will be the surface of the liquid in the tube) through the transparent part of the horizon glass, at the same time moving the index with the left hand, till the reflex solar spot coincides with the artificial horizon, above named. Then the degrees counted in the usual manner will give the sun's altitude.

What I, the said CHARLES GOULDING, claim as my invention, and which I desire to secure by Letters Patent, consists in—

The arrangement of the water level with the quadrant or sextant, in the manner before described, for showing the place of the horizon when it cannot be seen; which will enable navigators to take a correct observation of the sun's altitude, for determining the correct latitude in those cases (which often occur) when the sun is clear in the heavens, and the horizon is covered with a thick vapor and is quite invisible.

CHAS. GOULDING.

Witnesses:
JAMES H. WEED,
WM. BISHOP.